United States Patent

Yoshioka et al.

[11] Patent Number: 5,526,218
[45] Date of Patent: Jun. 11, 1996

[54] SURGE ABSORBING DEVICE TO PROTECT FROM OVERVOLTAGE AND OVERCURRENT

[76] Inventors: Naruo Yoshioka, 1019 OuazaYokoze, Yokoze-machi, Chichibu-gun, Saitama 368; Keisuke Kumano, c/o Senshin-ryou, 17-19, Nishiooi, 5-choume, Shinagawa-ku, Tokyo 140; Takashi Shibayama; Takaai Itou, both of 1014, OuazaYokoze, Yokoze-machi, Chichibu-gun, Saitama 368, all of Japan

[21] Appl. No.: 423,129

[22] Filed: Apr. 18, 1995

Related U.S. Application Data

[63] Continuation of Ser. No. 852,194, filed as PCT/JP90/01240, published as WO92/06524, Apr. 16, 1992, abandoned.

[30] Foreign Application Priority Data

Sep. 27, 1990 [JP] Japan ................................... 9001240

[51] Int. Cl.$^6$ ......................................... H02H 1/00
[52] U.S. Cl. ................... 361/119; 361/56; 337/31
[58] Field of Search ..................... 361/56, 111, 119, 361/124, 104; 337/29, 31, 32, 310

[56] References Cited

U.S. PATENT DOCUMENTS

| | | | |
|---|---|---|---|
| 4,062,054 | 12/1977 | Simokat | 361/119 |
| 4,305,109 | 12/1981 | Schilling et al. | 361/119 |
| 4,511,957 | 4/1985 | Matsumura et al. | 361/124 |

*Primary Examiner*—A. D. Pellinen
*Assistant Examiner*—Sally C. Medley
*Attorney, Agent, or Firm*—Hoffman, Wasson & Gitler

[57] ABSTRACT

A surge absorbing device with protection function to protect a circuit from overvoltage and overcurrent, comprising a gap or microgap surge absorbing element and a lower melting point metal wire connected therewith. A plurality of gap or microgap surge absorbing elements to the circuit to be protected, and each of the lower melting point metal wires respectively corresponding to each of gap or microgap surge absorbing elements being in contact with all of the gap or microgap surge absorbing elements.

3 Claims, 1 Drawing Sheet

5,526,218

SURGE ABSORBING DEVICE TO PROTECT FROM OVERVOLTAGE AND OVERCURRENT

This is a continuation of application Ser. No. 07/852,194 filed on Jul. 17, 1993 abandoned.

FIELD OF THE INVENTION

The present invention relates to a surge absorbing device for protecting a circuit substrate from firing and overheating even when overvoltage or overcurrent is applied to the circuit substrate.

BACKGROUND OF THE INVENTION

A surge absorber is used to protect equipment such a communication line, e.g. a telephone line connected to a telephone and telecopier, and a line for a cable television and a cable radio and the like, as well as a device, e.g. semiconductor device, from a lightning surge.

A protection function of the surge absorber is to protect a communication device connecting communication lines when the communication line interconnects the source line to load overcurrent or overvoltage on the line, which will heat the breaker fuse wire so as to melt the wire, thereby opening the circuit to protect the equipment from the overcurrent and overvoltage. A conventional surge absorber is disclosed in Japanese Patent Publication No. 63-11022. Further, the inventors disclose in Japanese Patent Publication No. 63-205026/1988 that a low melting point metal wire is provided in contact with the surface of a microgap surge absorbing element so that the heat generated by overvoltage or overcurrent charged in the surge absorbing element will easily and rapidly melt the low melting point wire, thereby, opening the circuit. The structure of mounting the low melting point metal wire on the surface of the surge absorbing element is housed within a case of inorganic material.

Heretofore, such a surge absorbing element exhibiting a protection function has been individually used in a communication line, or a line to earth. As shown in FIG. 3, communication equipment is individually connected to a surge absorbing device. For example, when an overvoltage or overcurrent is charged through T, R and then G in FIG. 3, the surge absorbing component B initially discharges, so as to melt the lower melting point metal wire in the component B, and subsequently both of the surge absorbing components discharge, melting the lower melting point metal wire in the component A. Therefore, it will take about twice as much time for one surge absorbing component to melt down and to produce an open circuit.

SUMMARY OF THE INVENTION

The present inventors have investigated the development of a shorter response time of the surge absorbing component to load to protect against overvoltage or overcurrent. It has been found that by using a plurality of lower melting point metal wires in contact with a plurality of surge absorbing elements the response time has improved. In other words, the heat generated when only one surge absorbing element discharges (further, the heat generated by a plurality of surge absorbing elements is higher) can simultaneously melt multiple lower melting point metal wires so as to make open circuits of multiple surge absorbing elements, and therefore, the time to open circuit will be significantly shortened and improved.

These surge absorbing devices, having a rapid response to open the circuit can be accomplished, so that the safety of the circuit, using the surge absorbing device would be improved. That is, a module of the present invention comprising a plurality of surge absorbing elements to simultaneously open the circuit at the time when the lower melting point metal wire is melted is provided, thereby rapidly opening the circuit.

A surge absorbing element is defined as an equipment used to avoid application of overvoltage and overcurrent by providing a gap or microgap on a portion of a conductive thin film, such that discharge will occur through the gap or microgap, when overvoltage higher than the optical level is applied on the gap or microgap, generating a branch flow for the overvoltage or overcurrent, and in ordinal structure, the conductive film having the gap or the microgap is enclosed and sealed in gas-charged tube. Therefore, this device can be called a gap or microgap surge absorbing element.

A surge absorbing device having a protection function is defined as a network or module including a surge absorbing element to protect a communication device connecting communication lines when the communication line interconnects the source line, with lower melting point metal wire, so as to prevent overheating and fire due to the overcurrent or overvoltage on the line.

The base for the surge absorbing device can be made from a resin such as epoxy resin and polybutadiene type resin. The desired number of lead pins having a diameter of approximately 0.5 to 1.0 mm and a length of approximately 10 mm are mounted on the surface of the resin base. Furthermore, the resin base has a structure on which an inorganic housing or cover glass tube can be fixed with its margin. Within the housing, gap or microgap surge absorbing elements are mounted or fixed between the lead pins. In other words, the lead pins are mounted on the resin base, and then the lead wires of the elements fix the elements, and the lower melting point wires are mounted on the predetermined pins, being in contact with the elements.

The response time is shorter, and the heat is prevented from being emitted from the device, and therefore, the influence of the heat can be restrained within the space of the surge absorbing device, and does not affect the outside of the component.

The efficiency of assembling the inventive surge absorbing device can be improved by using a predetermined number of the lead pins which are previously mounted or fixed on the resin base, so as to assemble or fix the surge absorbing elements within the device.

DETAILED DESCRIPTION OF THE INVENTION

Figure 1:
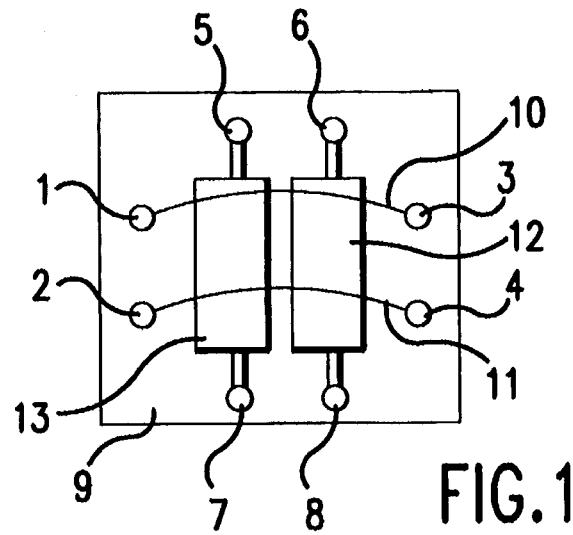
FIG. 1 schematically shows a structure of a surge absorbing device according to the present invention.

FIG. 1 schematically shows a structure of the surge absorbing component having a protection function according to the present invention. Two surge absorbing elements 12 and 13 are arranged and mounted on a resin base 9 to which the desired number of lead pins, in this case, eight lead pins 1, 2, 3, 4, and 5, 6, 7 and 8 are mounted. The two surge absorbing elements are mounted through the lead pins, and two lower melting point metal wires 10 and 11 are mounted by the lead pins. These wires are in contact with the two surge absorbing elements, and a resin case completely covers the structure.

The inventive surge absorbing device having protection function can be used in a connector with a telephone line, a telecopier machine, and a telephone exchanging machine, in order to protect them from a surge and overvoltage and overcurrent.

The present invention is further illustrated by the following example, but should not be interpreted for the limitation of the invention.

Example

FIG. 1 shows a schematic view of a structure of an embodiment of the surge absorbing device having protection function of the present invention.

A microgap surge absorbing element 13 which has a direct current voltage of 300 V at which the discharge will be initiated, is mounted and connected between lead pins 5 and 7 on a resin base 9. A second, similar microgap surge absorbing element 12 (direct discharge initiating voltage= 300 V) is mounted and connected between lead pins 6 and 8 by spot welding.

A silver lead wire is used as a lower melting point metal wire, and the two metal wires 10 and 11 are mounted between the lead pins 1 and 3 and between the lead pins 2 and 4 by soldering, so that they are made in contact to the surge absorbing elements 12 and 13. Furthermore, a resin housing is provided over the entire resin base 9, surrounding the whole structure.

Figure 2:
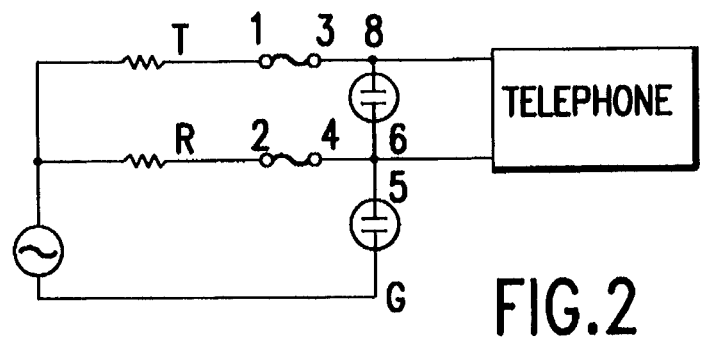
FIG. 2 schematically shows a circuit for a surge absorbing component according to the present invention, which circuit is used for a load test thereof.
Figure 3:
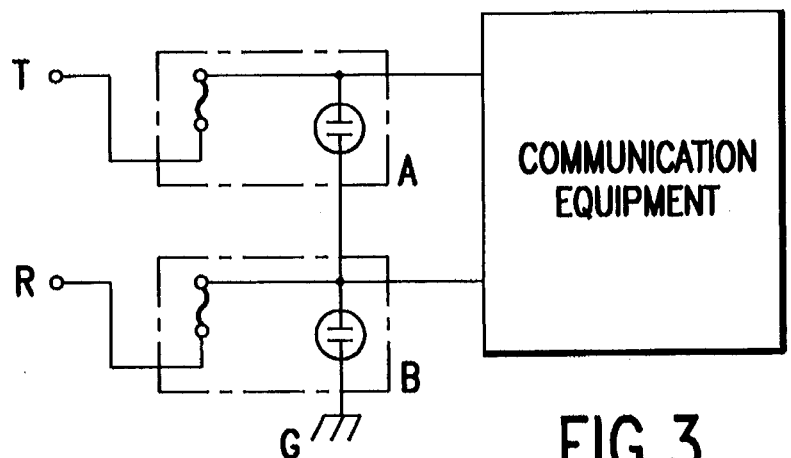
FIG. 3 schematically shows a circuit diagram of a prior art surge absorbing device.

The inventive surge absorbing device having protection function is assembled and is connected as shown in the circuit diagram of FIG. 2, wherein the reference numbers correspond to the reference numbers of the lead pins in FIG. 1. The pins 3 and 8, and the pins 4, 5 and 6 are electrically connected in the circuit, so that the surge absorbing device with protection function are provided with the circuit as shown in FIG. 2.

The telephone equipment to be protected will be connected as shown in FIG. 2. Furthermore, resistances T, R and ground G are connected as shown in FIG. 2, and the source is connected through the resistance R so that a loading test is performed.

The above assembled surge absorbing device having protection function was tested by charging overvoltage between T+R and G. The prior art product was similarly tested. The result is described below in Table 1.

Herein, the reference product has the above-mentioned conventional structure, i.e. a temperature fuse is mounted around the surface of the gap or microgap surge absorbing element, and will melt when heated, so that the protection function is provided.

TABLE 1

| Test Condition | | | |
|---|---|---|---|
| Applied Voltage | AC 600 V | AC 600 V | AC 600 V |
| Applied Current | 40 A | 7 A | 2.2 A |
| Application Way | (T + R) – G | (T + R) – G | (T + R) – G |

TABLE 1-continued

| Result Time of opening the circuit | | | |
|---|---|---|---|
| Inventive Product | 30–70 mm seconds | 300–600 | 3.0–6.0 |
| Reference | 30–70 mm seconds | 400–800 | 3.0–12.0 |

It is apparent from Table 1 that the inventive product evidences significant improvement of the performance in range of lower current applied. The lower the current which is applied, the more significant is the improvement.

Industrial Utilization

The inventive surge absorbing device with a protection function to protect from overvoltage or overcurrent comprises only a plurality of gap or microgap surge absorbing elements, and a plurality of lower melting point metal wires, each of which is in contact with all of the gap or microgap surge absorbing elements. This device has a rapid response when compared to the prior art surge absorbing device, so as to open rapidly the circuit, thereby providing a protection function from overvoltage or overcurrent.

In other words, when overvoltage or overcurrent is applied, the plurality of gap or microgap surge absorbing elements are heated, and then, such heat can rapidly melt the lower melting point metal wires, and therefore, the circuit of the surge absorbing elements is rapidly made to be open, so as to protect the circuit.

Therefore, the inventive surge absorbing device with the protection function can protect the equipment such as a telephone, telecopier, and telephone exchanger being connected to the line, from surge and overvoltage and overcurrent, thereby improving the operation performance of the surge absorbing device having the protection function.

We claim:

1. A surge absorbing device with a protection function to protect an electronic device from overvoltage produced on a communication line, comprising:

a plurality of gap or microgap surge absorbing elements, each of said elements connected to the electronic device; and a plurality of low melting point metal wires, each of said metal wires connected in series with the electronic device, each of said low melting point metal wires mounted in direct contact with the surfaces of all of said plurality of elements, each of said low melting point metal wires maintaining their integrity from heat generated by repeated transient surge voltage therethrough and said low melting point wires being fused by heat generated by a continuous overvoltage applied to said plurality of said elements, so as to produce an open circuit between the electronic device and the communication line.

2. The surge absorbing device according to claim 1, wherein said low melting point wires are made of a metal having a melting point below 400° C.

3. The surge absorbing device according to claim 1, wherein each of said wires is silver lead wire.

* * * * *